Feb. 27, 1968     B. E. STEELY     3,370,352
MULTIPLE PURPOSE PIPE TOOL ASSEMBLY
Filed July 26, 1965                                       3 Sheets-Sheet 1
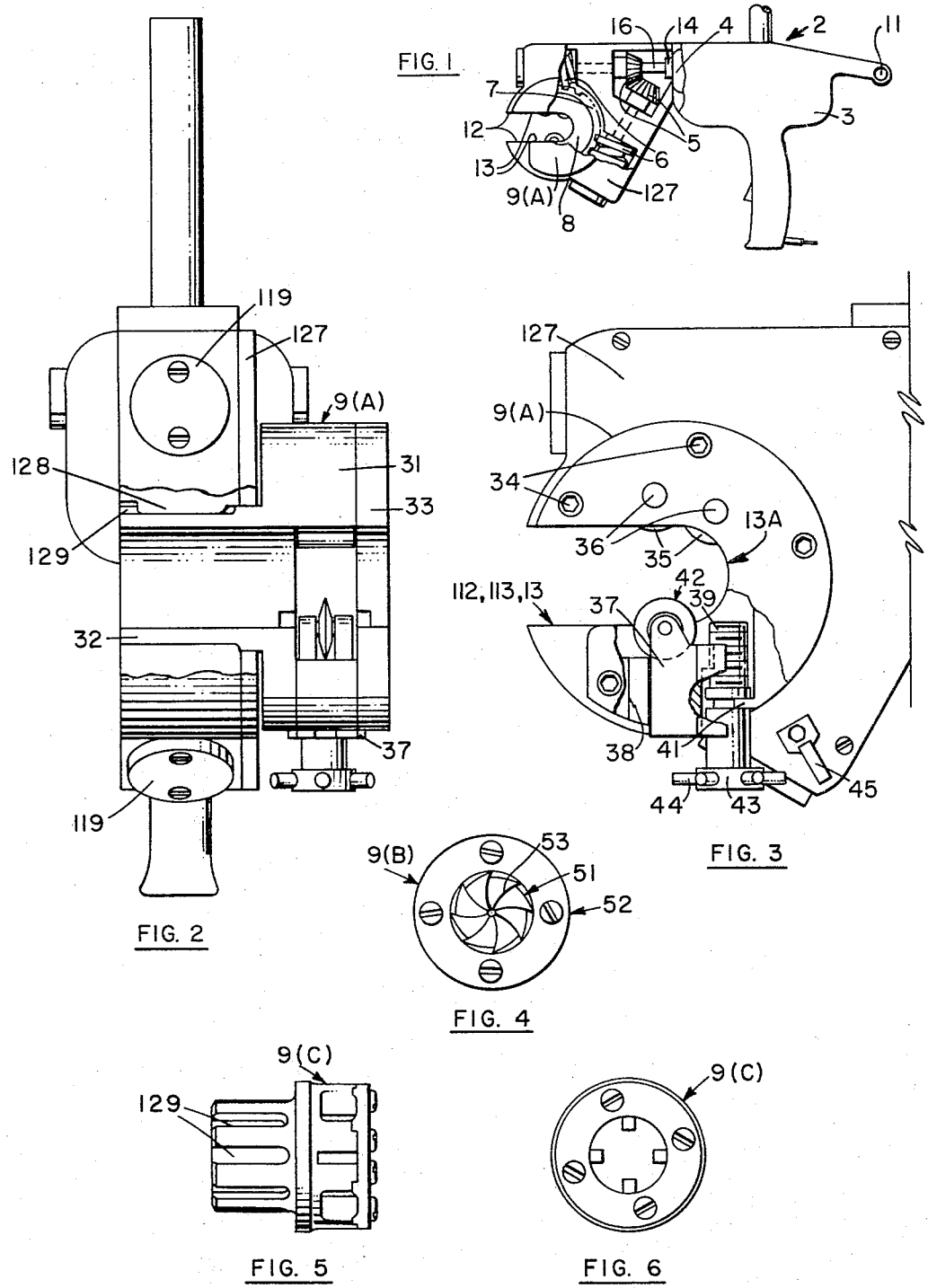

Feb. 27, 1968   B. E. STEELY   3,370,352
MULTIPLE PURPOSE PIPE TOOL ASSEMBLY
Filed July 26, 1965   3 Sheets-Sheet 3

United States Patent Office 3,370,352
Patented Feb. 27, 1968

3,370,352
MULTIPLE PURPOSE PIPE TOOL ASSEMBLY
Beauford E. Steely, Dallas, Tex., assignor to Cranford Corporation, Dallas, Tex., a corporation of Texas
Filed July 26, 1965, Ser. No. 474,836
5 Claims. (Cl. 30—97)

ABSTRACT OF THE DISCLOSURE

This invention is a multiple purpose tool for use by plumbers and pipefitters, and provides a means for power cutting and power threading, and performing other power operations on a pipe, even when the pipe is of a continuous length and is installed in place in a horizontal, vertical or other direction.

---

This invention relates to a multiple purpose pipe tool, and more particularly to a power driven hand held tool that may be used to perform work operations on pipe.

A primary object of this invention is to provide a portable power pipe tool having a removable tool unit that may be used to cut and/or perform other operations on a pipe even when the pipe is rigidly or loosely installed and when the ends are remote from the location where the pipe is to be cut.

Another object is to provide a hand held power tool that may be used to cut pipe that is installed in location permitting only one direction of access, such as in a trench and wherein the tool will both hold and cut the pipe.

A further object is to provide a pipe cutting tool that is power operated to rotate the cutting blade and is automatically operated to advance the cutting blade in a radial direction of the pipe.

This invention will provide a tool for performing one or more operations on a pipe, whether or not the pipe is free to move or is rigidly installed, and employs a power driven drive block and a removable tool unit in a portable housing. Both the housing and the drive block and the removable tool unit may include a corresponding radial opening whereby the entire tool may be slipped over a continuous length of pipe. A pair of worm drive gears mesh with a gear segment on a cutting tool unit so that continuous operation of the tool unit is achieved, and at the same time the cutting element on the tool unit is automatically advanced. The tool housing may also include an attached wrench to hold loose pipe when operations are performed thereon.

And an additional object of this invention is to provide a multiple purpose tool attachment for use with a standard conventional type of power drill that is in wide use among craftsmen.

And a further object is to provide a portable pipe tool that both holds the pipe and performs operations on the pipe simultaneously and selectively.

These and other objects and advantages will be apparent from an examination of the following specification and drawings in which:

FIGURE 1 represents a side elevational view of one embodiment of the multiple purpose tool of this invention;

FIGURE 2 is an end elevational view of tool shown in FIGURE 1;

FIGURE 3 is a detail view showing the pipe cutting accessory tool unit to be used with the device of FIGURES 1 and 2;

FIGURE 4 is a detail front view of a pipe reaming die used as an accessory tool unit with this invention;

FIGURE 5 is a detail side view of a standard pipe threading die used as an accessory tool unit with this invention;

FIGURE 6 is a front view of the device of FIGURE 5;

Figure 7:
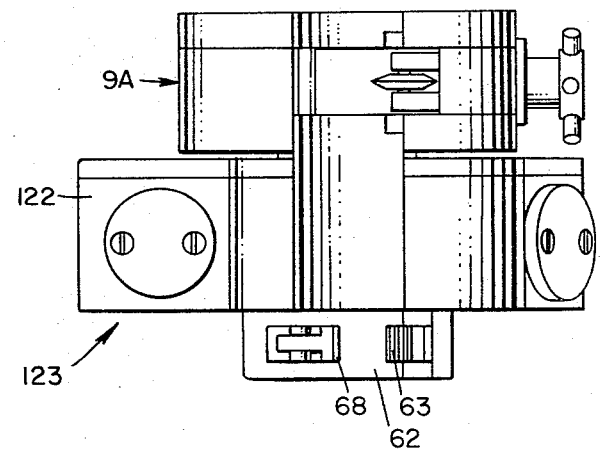
FIGURE 7 is an end elevational view of the attachment unit of one embodiment.

Referring now more particularly to the characters of reference on the drawing it will be observed in FIGURE 1 that the complete multiple purpose tool of this invention, identified generally at 2, consists basically of a housing 3 enclosing an electric motor 4 in driving relation with a pair of bevel drive gears 5 integrally attached to a pair of spaced apart worm gears 6, each meshing with a peripherial gear 7 on driven gear unit 8, to impart power rotation to the installed tool unit 9(A–C). The tool unit may be one of several devices for performing work functions in response to rotary power. For example, the tool unit shown at 9A in FIGURES 2, 3 and 7 is a pipe cutter or cut off tool unit, whereas the tool unit 9B of FIGURE 4 is a pipe reamer unit and the tool unit 9C of FIGURES 5 and 6 is a pipe threading die unit.

The external outline of housing 3 is interrupted at the side opposite the handle 11 to form an opening 12 which may be identified as a "side opening," and which will cooperate with parts hereafter described to permit the tool to be inserted over a pipe in a radial direction relative to a circular pipe. The external outline of the tool unit 9A is interrupted to form a slot 13, so that when slot 13 and opening 12 are aligned, the entire tool 2 may be installed in surrounding relation to a continuous pipe at a desired location intermediate the ends of the pipe, even when the pipe is installed in a location having limited access. One such location is when pipe is installed in a trench so that a tool to be used on such a pipe can approach to pipe only in one direction, i.e., from top of the trench that is open at the surface of the ground. In such instances the pipe is sufficiently off the bottom of the trench to permit the tool of this invention to be installed in surrounding relation to the pipe by approaching it from the top of the trench.

Figure 9:
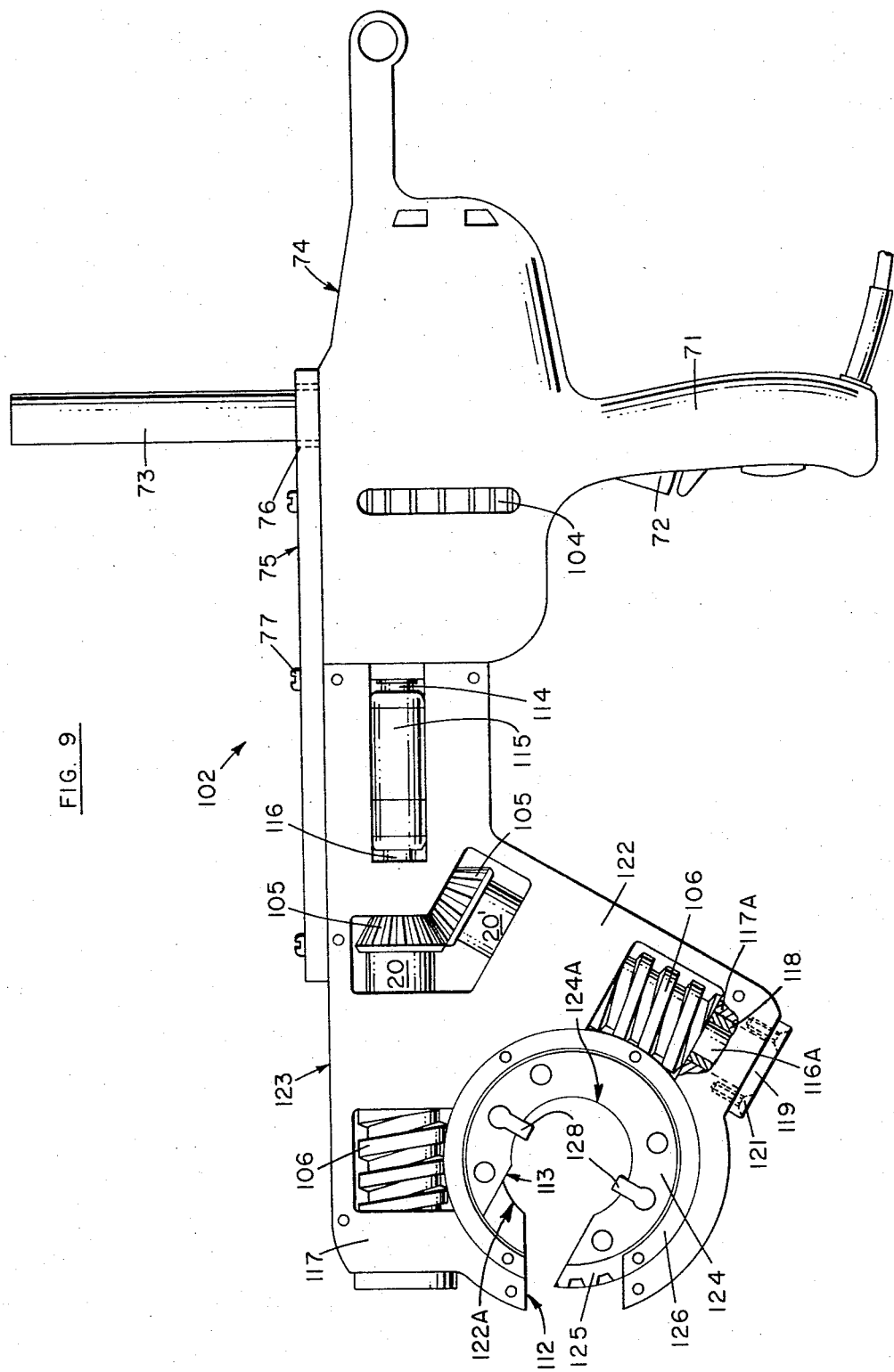
FIGURE 9 is a side elevational view of the embodiment of FIGURES 7 and 8 installed, and having the top cover removed for clarity of illustration.

Due to the similarity of the parts making up the embodiment of FIGURE 1 and those making up the embodiment of FIGURE 9, reference may be had to the latter figure for more detailed examination of the construction and function of this invention.

In the embodiment of FIGURE 1, the hollow output shaft 14 of the electric motor 4 corresponds to the hollow shaft 114 of motor 104 of FIGURE 9. The latter shaft is directly and permanently attached to chuck 115, which in turn is tightened about shaft 116 that is common to one bevel gear 105 and one worm gear 106. The shaft 14 of motor 4 is directly engaged by shaft 16 which is common to one bevel gear 5 and one worm gear 6 and is physically attached thereto by a key, set screw or other known means.

In the embodiment of FIGURE 9 it may be desirable to utilize a single shaft 116 that extends from chuck 115 to a bearing housing 117 containing a bushing or bearing (not shown), and to attach bevel gear 105 and worm gear 106 thereto by set screws. The shorter shaft 116A terminates at its bevel gear 105 at one end and in a bushing 118 in housing 117A. Each housing 117 and 117A is capped with a cap 119 held on by screws 121. The main housing 122 of the complete attachment 123 is so arranged that the shafts 116 and 116A may be inserted through the openings under the end caps 119 after the drive block 124 with its attached gear segment 125 has been inserted. The housing is cut away to provide bearing support for the rotating drive block 124 on one side, and ring 126 acts as the bearing support for the other side of the block. When the top cover 127 is installed (as shown in FIGS. 2 and 3) onto housing 122 the gears are all enclosed to prevent exposure and to retain grease for their operation. The drive block 124 includes a pair of keys 128 at opposite sides of a central opening 124A to engage corresponding grooves 129 in the selected tool unit 9A, B, C, etc. Drive block central opening 124A joins a side slot 113, and housing central opening 122A joins side opening 112 (FIGURE 9) to provide cooperative alignment of all such slots and openings with central opening 13A and slot 13 as shown in FIGURE 3.

Figure 8:
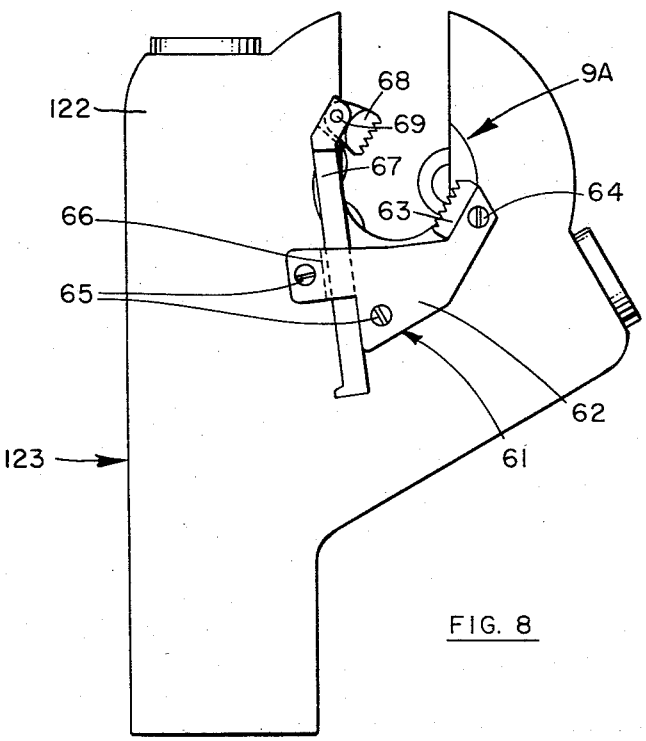
FIGURE 8 is a side elevational view of the device of FIGURE 7.

The pipe cutter tool unit 9A may be used with equal facility in the embodiments 2 of FIGURE 1 and 102 of FIGURE 9, and, of course in the attachment 123 of FIGURES 7 and 8. This tool unit 9A is seen best in FIGURES 2 and 3 to comprise a main body 31 from which projects a hollow shaft 32 and to which is fastened a cover plate 33 by screws 34. Portions of the body 31 form cavities for the reception of pipe rollers 35 on their axles 36, and for cutter block 37 which is moved in guideways 38 by the advance and retract screw 39 secured in the body by a lock ring 41 formed in the body and by block 37 into which screw 39 is threadedly engaged. The cutter wheel 42 is journalled in the block 37 so that it turns freely when cutting a pipe that is rotatably positioned on rollers 35. The keyway slots 129 terminate short of the full length of shaft 32 so that the main body 31 will be spaced from the cover 127 or from the housing 3 in operation. The advance screw 39 includes a wheel 43 having spokes 44 so positioned that once during each rotation of tool unit 9A, a spoke 44 is moved by trip arm 45 attached to the outer side of cover 127. This action advances the block 37 and consequently the cutter wheel 42 so that the wall of a pipe may be cut clear through.

The tool unit 9C is a conventional pipe threader die which may be installed into drive unit 124 in such a way that its grooves 129 engage the keys 128 and the tool may then be used to thread pipe. The reamer tool unit 9B though not a conventional unit, may be installed in a similar manner. The conical reamer head 51 is rigidly installed into tool unit body 52, so that upon power rotation of the body 52, the fluted reamer teeth 53 will cut into the interior pipe wall and leave an internal bevel therein.

The attachment 123 of FIGURES 7 and 8 is equipped with a wrench unit 61 to rigidly hold the pipe being worked. This wrench unit is also attached to housing 3 where desired. Unit 61 includes a body 62 having jaw 63 pivoted therein by screw 64. The body 62 is attached to housing 122 by screws 65 and includes a hollow guideway 66 through which slide rod 67 carrying jaw 68 may operate. Jaw 68 is pivoted to rod 67 by pin 69 so that the jaw 68 may engage and bind a pipe in cooperation with jaw 63 when the torque on the pipe is in one direction. The jaws 63 and 68 permit the pipe to slip when the torque is in the other direction. Housing 122 supports shafts 116 and 116A and abuts gear hubs 20 and 20′.

A hand grip 71 containing a trigger 72 is present in both embodiments, as is steadying rod 73. The attachment 123 is secured to its power tool unit 74 by means of a coupling bar 75 having a hole 76 that slips over rod 73 (FIG. 9) before attaching screws 77 are engaged to both the attachment 123 and the power unit 74. The combination of the hole 76 engaging rod 73 and the housing 122 surrounding chuck 115 and abutting power unit 74 and the engagement of shaft 116 by chuck 115 insures a structural and operational coupling between the power unit 74 and the attachment 123.

From the foregoing description it will be readily seen that there has been produced a device which substantially fulfills the objects of this invention as set forth herein. The invention is not limited to the exemplary construction herein shown and described, but may be made in many ways within the scope of the appended claims.

What is claimed is:
1. A portable power pipe cutter tool comprising:
 (a) a housing defining an opening,
 (b) a rotatable drive block having a slot installed in said housing and defining a central opening in alignment with said housing opening,
 (c) a removable pipe cutter tool unit in said central opening,
 (d) said cutter unit defining a slot in alignment with said drive block slot,
 (e) said cutter unit comprising rollers for rotatably receiving a pipe and a rotary blade for engaging and cutting the pipe,
 (f) means to key said cutter tool unit and said drive block together for joint rotation;
 (g) power means in said pipe cutter tool to drive said block and tool unit,
 (h) said power means comprising a motor,
 (i) a shaft driven by said motor,
 (j) a drive gear on said shaft,
 (k) a gear on said drive block in mesh with said drive gear,
 (l) said cutter tool unit defining an opening in registration with said central opening of said drive block to permit a pipe to pass therethrough;
 (m) a clamping means unit physically attached to said housing at a location to hold said pipe rigidly when said tool unit is rotating and performing work operations on said pipe.

2. A hand held power pipe tool comprising:
 (a) a housing defining a side opening,
 (b) a drive block rotatably installed in said housing and defining a central opening joining a slot corresponding in size to said side opening,
 (c) said drive block being movable to a position whereat said slot and said side opening are in alignment whereby the tool may be installed over a continuous pipe,
 (d) means comprising power means in said tool to drive said drive block,
 (e) said power means comprising a motor,
 (f) an output shaft driven by said motor,
 (g) a second shaft driven from said output shaft,
 (h) a worm gear drive gear on each shaft,
 (i) a peripheral gear segment on said drive block in mesh with each worm drive gear,
 (j) a removable pipe cutter unit in said central opening of said drive block for rotation with said drive block,
 (k) said cutter unit defining a slot in alignment with said drive block slot,
 (l) said cutter unit comprising rollers for rotatably receiving a pipe and a rotary blade for engaging and cutting the pipe.

3. A hand held power pipe tool comprising:
 (a) a housing defining a side opening,
 (b) a drive block rotatably installed in said housing and defining a central opening and a slot corresponding in size to said side opening,
 (c) said drive block being movable to a position whereat said slot and said side opening are in alignment whereby the tool may be installed over a continuous pipe,
 (d) power means in said tool to drive said drive block,
 (e) said power means comprising a motor,
 (f) an output shaft driven by said motor,
 (g) a second shaft driven from said output shaft,
 (h) a drive means on each shaft,
 (i) a peripheral gear segment on said drive block in mesh with each drive gear,
 (j) keying means in said central opening,
 (k) a unitary removable pipe cutter tool unit inserted in said central opening, said cutter unit comprising rollers for rotatably receiving a pipe and a rotary blade for engaging and cutting said pipe,
(l) keying means on said removable tool unit corresponding to said central opening keying means whereby said tool unit is driven from said motor.

4. A hand held power pipe tool comprising:
(a) a housing defining a series of cavities and a side opening,
(b) a rotatable drive block installed in one of said cavities and defining a central opening and a slot corresponding to said side opening,
(c) a unitary removable pipe cutter unit including a slot in said central opening,
(d) means to key said cutter unit and said drive block together at a location such that said slots are in registration,
(e) power means in said tool to drive said drive block and cutter unit,
(f) said power means comprising a motor,
(g) a shaft driven by said motor,
(h) a second shaft driven from said shaft,
(i) a worm drive gear on each shaft,
(j) a bevel gear on each shaft and in mesh with each other,
(k) a peripheral gear segment on said drive block and in mesh with each worm gear,
(l) said gears operating in cavities in said housing,
(m) a cutter element in said cutter unit,
(n) and means to automatically advance said cutter element when said cutter unit and drive block are rotating.

5. A portable power pipe tool comprising:
(a) a housing defining a side opening,
(b) a rotatable drive block installed in said housing and defining a central opening and a slot corresponding to said side opening,
(c) a unitary removable pipe cutter unit including a slot installed in said central opening,
(d) means to key said cutter unit and said drive block together at a location such that said slots are in registration,
(e) power means in said tool to drive said drive block and cutter unit,
(f) said power means comprising a motor,
(g) a shaft driven by said motor,
(h) a second shaft driven from said shaft,
(i) a drive gear on each shaft,
(j) a second gear on each shaft and in mesh with each other,
(k) a gear segment on said drive block and in mesh with said drive gears,
(l) said cutter unit comprising a screw adjusted cutter block,
(m) a cutter in said cutter block for making contact with a pipe,
(n) an advance and retract screw in mesh with said cutter block for moving said cutter block and cutter toward said pipe,
(o) a spoke wheel on said screw,
(p) a trip arm located on said housing in alignment with the path of said spoke wheel whereby said spoke wheel and screw are rotated to advance said cutter block and cutter toward and into said pipe during rotation of said drive block and cutter unit.

References Cited
UNITED STATES PATENTS

| | | | |
|---|---|---|---|
| 882,432 | 3/1908 | Thomas | 30—99 |
| 1,242,931 | 10/1917 | Foringer | 30—99 |
| 1,749,861 | 3/1930 | Vosper | 30—97 |
| 1,932,462 | 10/1933 | Howlett | 30—97 |
| 1,985,541 | 12/1934 | Hoefer | 30—97 |
| 2,195,568 | 4/1940 | Hexdall | 10—87 |
| 2,271,582 | 2/1942 | Dixon | 30—97 |
| 2,769,235 | 11/1956 | Martois | 30—97 |
| 2,782,500 | 2/1957 | Kelley | 30—99 |

MYRON C. KRUSE, *Primary Examiner.*